United States Patent
Biensan et al.

[11] 3,898,199
[45] Aug. 5, 1975

[54] PROCESS FOR OBTAINING POLYAMIDES FROM LACTAMS

[75] Inventors: Michel Biensan; Philippe Potin, both of Billiere, France

[73] Assignee: Societe Aquitaine-Total-Organico, Tour Aquitaine, Paris, France

[22] Filed: Sept. 25, 1974

[21] Appl. No.: 509,068

Related U.S. Application Data

[63] Continuation-in-part of Ser. No. 281,225, Aug. 16, 1972, Pat. No. 3,855,182.

[30] Foreign Application Priority Data

Aug. 25, 1971 France .............................. 71.30754

[52] U.S. Cl. ........... 260/78 L; 260/78 P; 260/45.85
[51] Int. Cl. ............................................. C08g 20/18
[58] Field of Search ......................... 260/78 L, 78 P

[56] References Cited
UNITED STATES PATENTS

| | | | |
|---|---|---|---|
| 3,207,729 | 9/1965 | Giberson | 260/78 P |
| 3,855,182 | 12/1974 | Potin et al. | 260/78 L |

*Primary Examiner*—Lucille M. Phynes
*Attorney, Agent, or Firm*—Burgess, Ryan and Wayne

[57] ABSTRACT

This invention concerns a process for obtaining polyamides in which the polyamide is mixed with one or more compounds having the formula:

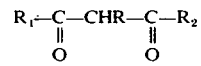

where $R_1$ and $R_2$ are organic radicals, and R is an organic radical or hydrogen.

9 Claims, No Drawings

PROCESS FOR OBTAINING POLYAMIDES FROM LACTAMS

This application is a continuation in part of application Ser. No. 281,225 filed Aug. 16, 1972 which is now U.S. Pat. No. 3,855,182 granted Dec. 17, 1974.

This invention concerns an improved process for obtaining polyamides. More specifically, it concerns an improved process for obtaining polyamides from lactams having at least four carbon atoms in the ring, particularly caprolactam and/or dodecalactam.

This invention also concerns polyamides obtained by the improved process, and further includes films, bands, fibres and molded objects made from the polyamides.

ξ-caprolactam can be used to obtain substances with a high molecular weight, when the lactam is heated in an anhydrous medium in the presence of substances setting free an alkali ion, such as sodium, sodium hydride, sodium and potassium alcoholate, and particularly in the presence of a sodium salt of the lactam used. Polymerization takes place at temperatures between 220° and 250°C, or at lower temperatures, between 150° and 180°C, if an activator is added.

The 6-polyamides obtained in this manner are rather unsatisfactory, since their viscosity is unstable. During the subsequent treatments at usually fairly high temperatures, to which such polyamides are subjected in the making of fibres, films, sheets, molded objects, etc., the molecular weight is found to decrease rapidly, and it is almost impossible to obtain uniform viscosity in the molten state within a reasonable period of time. This drawback arises from the fact that the polymerization is an equilibrium reaction, with the equilibrium adjusting to produce lactam when the temperature rises. At 230°C, for instance, approximately 10% of the monomeric lactam is found in the molten polymer.

This equilibrium reaction makes it impossible to remove the caprolactam in the anionic 6-nylon by degassing, since the equilibrium is immediately re-established by depolymerization, as the monomer is extracted.

To prevent the decomposition of the polymer that occurs in existing processes, it has to be washed with an acidified aqueous solution, to eliminate the sodium. This has to be followed by washing with water and drying, which considerably increases the cost of the polyamide.

In the case of dodecalactam, it is also possible to obtain polyamides with high molecular weight, when the lactam is heated in an anhydrous medium, in the presence of substances setting free an alkaline ion, such as sodium hydride or alcoholate, or the sodium salt of the lactam used. Polymerization takes place at temperatures between 230° and 270°C, or at lower temperatures if an activator is added.

No depolymerization occurs in the 12-polyamides obtained by this process, but there is a completely chaotic development of the melting viscosity of the polymer and its viscosity in solution, resulting from a simultaneous process of chain breakage and disorderly branchings.

This invention concerns an improved process for obtaining polyamides having a high molecular weight, in which said objections can be overcome. The process is of particular interest because it can be applied to the anionic polymerization, in an anhydrous medium and in the presence of alkali catalysts, of all lactams, producing polyamides with completely stable viscosity in the molten state. The process is particularly suitable for instance, to obtain polymers and copolymers from caprolactam, carpyllactam and/or dodecalactam.

This invention concerns a process for obtaining polyamides by anionic polymerization of lactams in an anhydrous medium, in the presence of alkali catalysts, typically sodium catalysts, and optionally with activators, characterized by the fact that the resulting polymer is mixed with one or more compounds of the general formula:

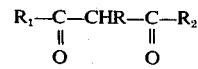

$$R_1-C-CHR-C-R_2$$
$$\phantom{R_1-}\overset{\|}{O}\phantom{-CHR-}\overset{\|}{O} \quad\quad I$$

where $R_1$ and $R_2$ are organic radicals and R is an organic radical or hydrogen.

In one embodiment of the invention, the radicals $R_1$ and $R_2$ are aliphatic radicals or radicals of the formula:

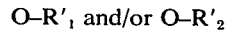

$$O-R'_1 \text{ and/or } O-R'_2$$

where $R'_1$ and $R'_2$ are aliphatic radicals.

More particularly, R is hydrogen or lower alkyl of 1 to 7 carbon atoms, $R'_1$ is lower alkyl of 1 to 7 carbon atoms, $R'_2$ is lower alkyl of 1 to 7 carbon atoms or lower alkoxy of 1 to 7 carbon atoms. Among the substances falling within the scope of Formula I are diketones, suitably 1 : 3 diketone such as acetyl acetone and keto-esters and suitably, ethyl acetyl acetate.

Other substances falling within Formula I are esters and they form the basis of said co-pending application, Ser. No. 281,225, filed Aug. 16, 1972 now U.S. Pat. No. 3,855,182.

According to one feature of the invention, diketones are added to the polyamide in ratios of between 0.05 and 2 moles, and preferably 0.2 to 1 mole, per 100 moles of the initial lactam; the proportions being dependent on the quantity of sodium present at the beginning.

In one embodiment of the invention, the diketones are added at the end of polymerization, by being mixed with the molten polymer in the polymerization reactor.

In another embodiment of the invention, the substances are added to the polymer by being made into a paste, followed by mixing or extrusion.

The invention also concerns fibres, films, sheets, molded objects and other products made from polyamides produced by this process.

Other purposes and advantages of the invention will be shown by the following examples representing some embodiments of the invention, which, however, is in no way confined to these examples.

Unless otherwise stated, the inherent viscosity was measured at 20°C, using 0.5% solutions in m-cresol. The flow index of the polyamides was measured, namely the weight of product flowing through a 1.35 mm nozzle at a temperature of 240°C, when a pressure of 2 kg/sq.cm is applied.

EXAMPLES 1 AND 2

Dodecalactam was polymerized anionically in a Grignard reactor at 240°C, using a catalyst containing 1% moles of sodium. When polymerization was completed, the product was extruded through a nozzle at the base of the reactor.

For the stabilizing agent test, a substance selected from compound I was added to the molten polymer, and homogenized for 30 minutes. Samples were then taken, after 1, 2, 3 and 4 hours.

Example 1 was a control test done for comparison purposes, in which the polymer was extruded without any of the compound I proposed in this invention being added.

In Example 2, the stabilizing agent was 1% moles of ethyl malonate.

TABLE I

| | Time in hours | 0 | 1 | 2 | 3 | 4 |
|---|---|---|---|---|---|---|
| Flow index (g/mn) | Example 1 (control) | 75 | 35 | 21 | 13 | 0 |
| | Example 2 (with ethyl malonate) | 91 | 113 | 112 | 80 | 68 |

EXAMPLES 3 AND 4

12-nylon was obtained by anionic polymerization of dodecalactam in the presence of 0.72% moles of sodium, and extruded at 230°C, in the same way as in Examples 1 and 2.

Example 3 was a control test done for comparison purposes, in which the polymer was extruded without any of the substances proposed in this invention being added.

In Example 4, the stabilizing agent was 1% moles of a suitable keto-ester such as ethyl acetyl acetate.

The inherent viscosity was measured at 20°C, using 0.5% solutions in m-cresol.

The results are shown in Table 2 below.

Naturally, the invention is in no way confined to these embodiments. Many alternative forms are possible, for someone skilled in the art, without any departure from the spirit of the invention.

TABLE 2

| Example | Stabilizing agent | Non-extruded | 1st extrusion | 2nd extrusion |
|---|---|---|---|---|
| 3 | control | 1.41 | 1.22 | 1.20 |
| 4 | 1% moles of ethyl acetyl acetate | 1.41 | 1.34 | 1.30 |

The substances which according to the present invention are mixed with the polymer are under the circumstances, more acid than the amide functions of the polymers and lactams and produce only limited or no acidolysis of the polymer chain.

EXAMPLES 5 AND 6

12-nylon was obtained by anionic polymerization of dodecalactam at 250°C in the presence of a catalyst containing 0.5% moles of sodium and the polymer samples were taken in the same way as in Examples 1 and 2.

Example 5 was a control test done for comparison purposes in which the samples were taken without any of the diketones useful in this invention being incorporated into the polymer.

In Example 6, the molten polymer was added to 0.25% moles of acetylacetone before the series of samples being taken.

Flow index and inherent viscosity of the various samples were determined.

The results obtained are given in Table 3.

TABLE 3

| Time in hours | | 0 | 1.5 | 2.5 | 3.5 | 4.5 |
|---|---|---|---|---|---|---|
| Ex. 5 (Control) | Flow index (g/mn) | 295 | 163 | 95 | 30 | 0 |
| | Inherent viscosity | 1.27 | 1.06 | 1.02 | 1.07 | 1.02 |
| Ex. 6 with acetylacetone | Flow index (g/mn) | 254 | 345 | 297 | | 249 |
| | Inherent viscosity | 1.22 | 1.08 | 1.12 | 1.08 | 1.11 |

What is claimed is:

1. A process for obtaining high molecular weight polyamides which comprises anionically polymerizing a lactam having at least four carbon atoms in the ring in the presence of an alkali catalyst and mixing the resulting polymer with at least one compound of the formula

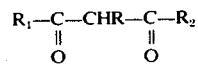

$$R_1-\underset{O}{\underset{\|}{C}}-CHR-\underset{O}{\underset{\|}{C}}-R_2$$

in which R is hydrogen or lower alkyl, $R_1$ is lower alkyl and $R_2$ is lower alkyl or lower alkoxy.

2. A process according to claim 1 in which said compound is acetyl acetone.

3. A process according to claim 1 in which said compound is ethyl acetyl acetate.

4. A process according to claim 1 in which the lactam is polymerized in an anhydrous medium in the presence of sodium catalysts.

5. A process according to claim 1 in which the lactam is a member selected from the group consisting of caprolactam, dodecalactam and capryllactam.

6. A process according to claim 1 in which said compound is added to the resulting polymer at a ratio of between 0.05 and 2 mols to 100 mols of the initial lactam.

7. A process according to claim 6 in which between 0.2 and 1 mol of said compound to 100 mols of lactam is added.

8. A process according to claim 1 in which said compound is added after polymerization, by being mixed with the molten polymer in the polymerization reactant.

9. A process according to claim 1 in which said compound is added to the polymer by being made into a paste, followed by mixing or extrusion.

* * * * *